(12) United States Patent
Vidolov

(10) Patent No.: US 10,696,345 B2
(45) Date of Patent: Jun. 30, 2020

(54) VEHICLE WITH AN INCLINED STEERING AXIS

(71) Applicant: Kliment Vidolov, Berlin (DE)

(72) Inventor: Kliment Vidolov, Berlin (DE)

( * ) Notice: Subject to any disclaimer, the term of this patent is extended or adjusted under 35 U.S.C. 154(b) by 234 days.

(21) Appl. No.: 15/741,453

(22) PCT Filed: Jul. 2, 2016

(86) PCT No.: PCT/EP2016/065628
§ 371 (c)(1),
(2) Date: Jan. 2, 2018

(87) PCT Pub. No.: WO2017/001698
PCT Pub. Date: Jan. 5, 2017

(65) Prior Publication Data
US 2018/0362109 A1  Dec. 20, 2018

(30) Foreign Application Priority Data

Jul. 2, 2015 (DE) .......................... 10 2015 008 685

(51) Int. Cl.
*B62K 5/10* (2013.01)
*B62J 17/08* (2020.01)
(Continued)

(52) U.S. Cl.
CPC .................. *B62K 5/10* (2013.01); *B62D 1/02* (2013.01); *B62J 17/08* (2013.01); *B62K 5/01* (2013.01);
(Continued)

(58) Field of Classification Search
CPC ............................ B62K 5/08; B60G 2200/464
See application file for complete search history.

(56) References Cited

U.S. PATENT DOCUMENTS 2,474,946 A * 7/1949 Kinslow ................ B62K 3/002
                                                280/87.042
3,620,547 A * 11/1971 Vaverek ................ B62K 3/002
                                                280/87.042
(Continued)

FOREIGN PATENT DOCUMENTS

DE    10 2014 201 632    9/2014
EP        2213561         8/2010
(Continued)

*Primary Examiner* — Kevin Hurley
(74) *Attorney, Agent, or Firm* — Thorpe North & Western, LLP

(57) ABSTRACT

The present invention relates to a vehicle, comprising a vehicle body, in particular a self-supporting vehicle body, wherein the vehicle comprises at least one drive which can be supplied by an energy store; and has a front wheel axle and a rear wheel axle. Furthermore, the vehicle has a steerable or steering axle and a steering module, wherein the steering axle is configured or defined by way of the steering module and extends, in particular, within the steering module, wherein the steering module has at least one wheel and preferably two wheels which are arranged coaxially with respect to one another, wherein the vehicle has or forms a steering axis and is configured in such a way that the steering module can perform a pivoting or rotational movement about the steering axis, and wherein the vehicle is configured in such a way that, as a result of the performance of the rotational movement of the steering module and with the support of the wheel or the wheels of the steering module on a roadway being maintained, a tilt movement of the steering axis in relation to the roadway is also performed, which tilt movement preferably leads to a tilted position of the vehicle in relation to the roadway.

15 Claims, 8 Drawing Sheets

(51) Int. Cl.
    *B62K 5/01*        (2013.01)
    *B62K 5/027*      (2013.01)
    *B62K 5/05*        (2013.01)
    *B62K 5/08*        (2006.01)
    *B62D 1/02*        (2006.01)
    *B62K 5/02*        (2013.01)

(52) U.S. Cl.
    CPC ............... *B62K 5/02* (2013.01); *B62K 5/027* (2013.01); *B62K 5/05* (2013.01); *B62K 5/08* (2013.01); *B62K 2204/00* (2013.01)

(56) References Cited

U.S. PATENT DOCUMENTS

| | | |
|---|---|---|
| 4,065,144 A | 12/1977 | Winchell |
| 5,975,229 A * | 11/1999 | Hosoda .................. A63C 17/12 |
| | | 180/180 |
| 9,283,989 B2 | 3/2016 | Spahl et al. |
| 10,486,765 B2 * | 11/2019 | McGowan ............. B62K 3/002 |
| 2017/0043805 A1 | 2/2017 | Krammel |

FOREIGN PATENT DOCUMENTS

| | | |
|---|---|---|
| FR | 2 946 944 | 12/2010 |
| GB | 2 013 592 | 8/1979 |
| WO | WO 2016/200278 | 12/2016 |

\* cited by examiner

VEHICLE WITH AN INCLINED STEERING AXIS

TECHNICAL FIELD

The invention relates to a vehicle with the features of the first portion of claim 1.

There are many options on the market to transport people. Each of the options depends on the respective target group. There is a demand to reach the desired goal as safe as possible, in an inexpensive manner, with little resource requirements and as quickly as possible. Such demand exists, in particular, in urban regions where the covered distances are shorter, but also in smaller towns. In urban regions there are small numbers of parking places for vehicles. With high traffic volume there is a risk of traffic jam. There are vehicles with a functionality which is directed to achieve enjoyment. Examples are electro rollers.

PRIOR ART

The skateboard has proved to be useful as a simple means of travelling in urban spaces. This is not classified as a vehicle in the sense of the road traffic act but as a sports device. It may also be motorized, as, for example, the INBOARD M1 with a motor inside the wheels or many others. A skateboard does not provide a possibility for the driver to assume a comfortable supported position and to experience a safe driving feeling.

Larger vehicles for up to two persons is known under the trademark "Renault Twizzy", "BMW CLEVER", "BMW C1" and Toyota i-Road" having a reduced functionality. The known vehicles are complex and expensive in relation to the offered functionality. U.S. Pat. No. 7,850,180 discloses a three-wheel vehicle with inclination technique. The inclination of the vehicle is controlled by leg power. The vehicle is separately steered by means of an additional steering device. The complexity of the hinging of the front wheels is a disadvantage of the known assembly as is a complex additional steering device. This vehicle also is expensive and requires much servicing efforts.

REPRESENTATION OF THE INVENTION

It is an object of the invention to overcome the disadvantages of known vehicles of the above mentioned kind and to provide a vehicle which can be manufactured at low costs without compromising important vehicle features. According to the invention this object is achieved with a vehicle with the features of claim 1.

The vehicle according to the present invention may be a tricycle. In such a case there are two wheels provided at one wheel axle and only one wheel at a second wheel axle. The wheel axle with two wheels can be either the front axle or the rear axle. Also, a vehicle can be provided which has two wheels at each of the two wheel axles. The steering unit can be selectively connected to the front or the rear axle.

The invention uses a steering unit for steering the vehicle which is rotatable about a steering shaft. Preferably, the steering unit has smaller spatial dimensions than the supporting structure. The steering unit comprises a steering unit main body. It is connected to a first wheel axle. The steering unit main body can be a separate component or group adapted to accommodate the first wheel axle, i.e. the steering wheel axle. The steering unit main body may also be tightly connected to the wheel axle, such as by, for example, welding. Furthermore, it is possible that the steering unit main body is an integral component of the wheel axle or forms the wheel axle. If the steering unit rotates about the steering shaft the steering unit main body, the wheel axle and thereby the wheels will follow such movement. Both wheels are coaxially arranged with respect to a common axis unless they have additional wheel alignment or wheel camber, which effect a well-defined deviation from the alignment. The wheel axle with the steering unit may also be designated as steering wheel axle.

With the vehicle according to the present invention it is provided that the steering shaft above the wheel axle in the plane perpendicular to the first wheel axle is directed in the direction remote from the vehicle. Therefore, if the steering unit is connected to the front axle the steering shaft extends upwards in the driving direction. It forms a pitch angle together with an axis within such plane perpendicular to the wheel axle and at the same time perpendicular to the driving plane. If the driving unit is connected to the back axle the steering shaft extends upwards against the driving direction.

Furthermore, the invention provides that the support structure is rotatably connected to the steering unit rotatable about the steering shaft. This is the steering angle. Upon generating a torque about the steering shaft with closed power flow within the vehicle a rotation of the steering unit about the steering shaft is effected. With an inclination of the steering shaft by a pitch angle according to the present invention such rotation causes that the support structure is inclined sideways relative to the driving surface while the wheels remain on the surface. The degree of such inclination is defined by the inclination angle. The steering wheel axle of a vehicle according to the present invention remains parallel to the driving surface during cornering. With such an inclination during cornering one can counteract the occurring centrifugal forces at higher velocities. Also, a sectional inclination of the support structure can be provided.

Contrary to known assemblies no independent wheel suspension is necessary for the purpose of steering. The combination of a steering shaft inclined about a pitch angel and rotatable connection between the steering unit and the support structure causes a high driving stability and good road contact. Only the steering unit is moved for steering. An inclination of the support structure, including the body with driving seat etc. follows such steering movement.

Contrary to a skateboard, for example, the driver is seated or stands in or on the support structure. The driver is continuously supported by the support structure. Preferably, the driver is in an upright position. This enables a long and comfortable journey similar to an automobile and a good overview of the traffic. According to the invention the support structure and the steering unit are designed in such a way that a torque can be exerted on the steering unit by a driver thus supported by the support structure. The steering unit must, therefore, be well accessible for the driver either directly or by transmission means such as pedals or levers.

The invention provides an inexpensive, stable and secure vehicle which can be easily and intuitively steered. The vehicle provides a high degree of driving pleasure. The steering unit can be rigidly connected to the first wheel axle. This enables a particularly inexpensive production. It is, however, also possible to select a resilient, damped or rotatable connection between the wheel axle and the steering unit main body. Also, a resilient, damped or rotatable independent wheel suspension can be provided for better comfort. In such cases the individual rotational axes of the two wheels at the steering wheel axle can relatively deviate from the alignment due to the suspension.

The wheels can also be accommodated at the steering first axle by some kind of parallelogram steering in the steering unit. This enables a sideways tilting movement of the wheels relatively to the steering first wheel axle. This corresponds to a tilted position of the wheels relative to the driving surface. The parallelogram steering couples the movement of both wheels whereby this can be effected in a well-defined manner. The wheels remain essentially parallel with respect to one another apart from a wheel alignment or a wheel camber.

The inclination of the steering shaft towards the front or the rear, resp. which is also designated as pitch angle, can be fixed. Then, there is an unambiguous relationship between the steering angle and the inclination angle of the support structure. At high velocities a strong inclination of the support structure of the vehicle in a bent is more advantageous than at low velocities. On the other hand, a small curve radius is desirable when maneuvering with low velocities without large inclination of the support structure.

Therefore, in a particularly preferred modification of the present invention there is a bearing provided for rotatably bearing the steering unit with a pitch axis extending parallel to the first wheel axle, whereby the steering shaft forms a pitch angle in the plane perpendicular to the wheel axle. Electronic and/or mechanic and/or hydraulic means for adjusting the pitch angle are provided. The adjustment of the pitch angle enables the adapting of the ratio between the inclination of the support structure and the curve radius. If the steering shaft is directed flatly forwards even a low curve movement will cause an inclination of the body or support structure. If the steering shaft is almost vertically directed there is almost no inclination of the body or the support structure. Preferably, the pitch axis extends parallel to the steering wheel axle, i.e. the first wheel axle. Even more preferably, the pitch axis is closer to the driving surface than the steering wheel axle.

In a preferred embodiment the bearing for rotatably bearing the steering unit is formed by a cross connector enabling a rotation of the steering unit about the pitch angle and a rotation of the steering unit about the steering shaft. The steering unit and the body are connected by two perpendicular rotational axles.

The pitch angle can be dynamically adjusted during the journey. The electronic means for adjusting the pitch angle can comprise in particular sensors for detecting the driving state of the vehicle and signal processing means for generating a control signal for controlling the pitch angle of the steering shaft according to the detected driving state. The driving state can be represented by, for example, the velocity, the weight of the driver, the inclination of the road surface, the previous driving behaviour or driving preferences, the driving surface condition and the like. The driving state detected by the sensors is transmitted to a signal processing unit. The signal processing unit can process the signals and generate a control signal for controlling the pitch angle. It is then adjusted to a set value with respect to the pitch axle by actuators at the steering unit. The actuators can be driven mechanically, hydraulically, pneumatically or electromechanically by, for example, small rotation or linear drives. It is also possible to generate a signal indicating to the driver in which direction the pitch angle should advantageously be changed by exerting a torque.

In a further modification of the invention it is provided that the pitch angle is adjusted according to the driving power. Thereby, it is achieved that a change of the driving power will result in a change of the pitch angle. Alternatively, or additionally, it can be provided that the pitch angle is adjusted according to the breaking power effective on the vehicle. In particular, it can be provided that a defined adjustment range of the pitch angle correlates to the driving power while another adjustment range correlates to the breaking power. Thereby, the driver can influence by exerting a power at the power receiving elements provided for this purpose.

When using mechanical means for adjusting the pitch angle at least one pedal, grip or another mechanical hand or foot operated actuator can be provided where a change of position causes a change of the pitch angle of the steering shaft. In the most simple case the driver pushes on the steering unit with the foot, similar as on a pedal, whereby it is inclined forwards if a more pronounced inclination in a curve is desired.

A means for fixing the set pitch angle can also be used. Such a means can be, for example, a latch mechanism releasably catching the steering unit in a desired position.

In a further embodiment of the invention a further cross connector element is provided which is rotatably connected to the first cross connector. With such solution the vehicle body and the steering unit are connected by three independent rotating axles. They are the pitch axle, the steering axle and another compensating pitch axle. In a neutral position the pitch axle and the compensating pitch axle are preferably coaxial. This assembly enables the adjustment of the pitch angle of the steering shaft without the need of a relative movement of the steering unit regarding the vehicle body as it is the case with only a single cross connector. Preferably, the pitch angle is adjusted by an actuator. The actuator is connected to both cross connectors. The actuator can be fixed to an end at the vehicle body as well as at the steering unit.

Preferably, the vehicle is provided with a drive and an energy store for supplying the drive with energy. Any kind of drive can be used and it can be operated, in particular, electrically or in the form of a combustion engine with fuel. It is understood, however, that all drives are suitable for such a vehicle.

The drive can be a wheel hub drive. It is, however, also possible to place the drive outside the driving wheel axle and drive the driving wheel by a gear.

An accumulator or a battery for supplying the electro drive with electrical energy can be designed as a removable module. It can be removed from the vehicle and recharged even outside of the vehicle. It is particularly advantageous if the charging electronics of the vehicle is integrated in the battery and both can be removed from the vehicle in the form of a module. Additionally, it is possible to design the charging electronics and the battery in the form of individual modules which are adapted to be connected to each other. Furthermore, it is possible to integrate an energy recuperation system which recharges the battery during brake application.

The support structure can be formed from pipes. In particular, pipes having the same diameter enable a very inexpensive manufacturing of a stable vehicle. The driving comfort is increased by seats, backrests, handles, baggage racks, cover panels and/or further components which are provided at the support structure. In particular, one or two seats are particularly preferred. Cover panels at the support structure will protect the driver and co-driver, if applicable, from environmental impact. A baggage rack or baggage compartment may be additionally provided depending on the application. It may, in particular, be provided between the driver and the co-driver.

Furthermore, it is advantageous, if there are body elements provided above the driver. They can provide a supplemental frame which is height adjustable in this range in order to provide optimum spatial conditions for drivers having different body sizes. The seat, also, may be height adjustable. It is advantageous, if the height adjustable supplemental frame comprises further functionalities of the vehicle, such as, for example, illumination, indicating instruments or rear mirrors.

The construction can provide a good overview of the traffic situation. A low footprint is achieved with the vehicle according to the present invention. The footprint is understood to be the space which is used when the vehicle is parked. Thereby, more vehicles may be parked in the same space. The traffic which is caused by such vehicles in search of the parking place is reduced. The vehicle according to the present invention is light and requires only little energy for production and moving.

In a particularly simple embodiment of the invention the steering unit is adapted to be operated by the feet of the driver. The steering unit then comprises a foot board or pedal where the driver can exert a power or torque with his feet. The weight of the driver is partly supported by the support structure and partly by the steering unit. The torque about the steering shaft effected on the steering unit will directly cause curved driving and an inclination of the support structure without further power transmission.

By connecting the steering unit to the rear axle the steering unit can be operated by further power transmitting and/or power generating elements. Such elements may be operated by the feet of the driver or his/her hands. The elements effect an adjustment of the steering angle and/or the pitch angle.

In a further embodiment of the invention a further steering unit is provided with two wheels for steering the second wheel axle.

Further modifications of the invention are subject matter of the subclaims. Embodiments are described below in greater detail with reference to the accompanying drawings.

Definitions

In this description and in the accompanying claims all terms have the meaning well known to the person skilled in the art which is defined in technical literature, norms and the relevant internet sites and publications, in particular of the lexical kind, such as www.wikipedia.de, www.wissen.de or www.techniklexikon.net, of competitors, research institutes, universities and associations, such as, for example, Verein Deutscher Ingenieure or Deutsche Physikalische Gesellschaft. In particular, the terms used here have not the opposite meaning of what the person skilled in the art will derive from the above publications.

Furthermore, the following meanings are the basis for the used terms:
drive: constructive unit which generates a force or torque by means of energy conversion. Often, this is a drive with an eventually necessary gear. It may be a rotary drive or a linear drive.
road: a portion of a street with vehicles driving thereon
road surface: the surface supporting the wheels of the vehicle
vehicle: technical device for moving
rear axle: the axle which is provided behind the vehicle center of gravity and carries the rear wheels by corresponding bearings.
cross connector (cardanic joint): connecting member with two perpendicular rotary axes which do not necessarily cross each other.
steering shaft: Shaft adapted to have a steering unit or a cross connector to rotate about it.
inclination: measure of the angle between two geometric elements such as axes or planes. In particular, it is a measure for the angle between the symmetric plane of the vehicle and the road.
pitch axis: direction perpendicular to the longitudinal axis of a body or an axis, respectively, about which the steering unit or the cross connector rotates.
wheel: a disc-shaped device having preferably a circular shape, which rotates about an axis which is perpendicular to an ideal circular plane and which is mostly used as a vehicle wheel.
wheel axle: machine element for rotatably bearing wheels.
front axle: the axle which is provided before the vehicle center of gravity and carries the front wheels by corresponding bearings.

DESCRIPTION OF THE KINDS OF EMBODIMENTS

Figure 2:
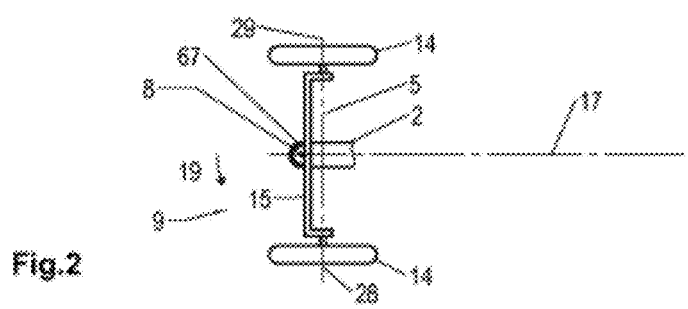
FIG. 2 is a top view of the steering unit of the tricycle of FIG. 1 in a neutral position.
Figure 3:
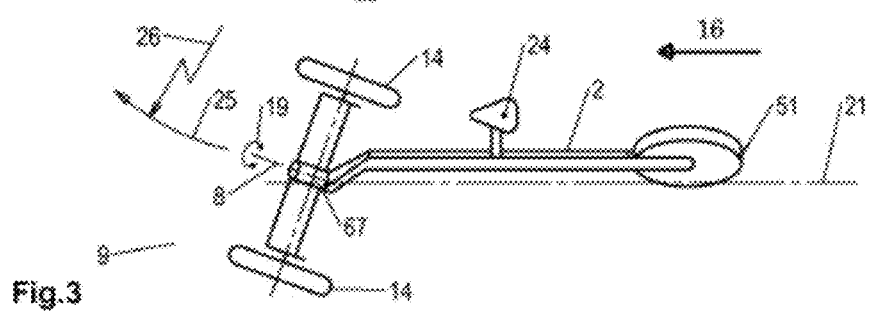
FIG. 3 is a top view of the tricycle of FIG. 1 when driving around a corner towards the right.

1. Embodiment: Tricycle with Steering Front Axle (FIGS. 1-3)

Figure 1:
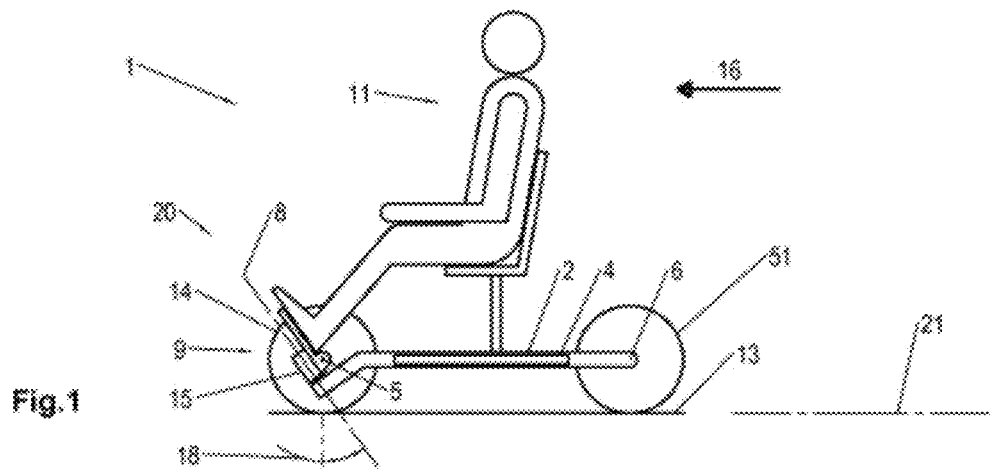
FIG. 1 is a side view of a tricycle with a steering front axle without adjustable pitch angel according to a first embodiment.

FIG. 1 shows a vehicle generally designated with numeral 1. The vehicle has an integral body 2. In the present embodiment the body 2 consists of a pipe construction which is described below in greater detail. Various pipes are welded together in such a way that a T-shaped footprint is achieved. This can be recognized, for example, in FIG. 3. It is understood, however, that a square footprint may be formed or a closed or semi-closed body may be used, also. Finally, it is also possible to use an integrated frame with or without covers.

The body 2 accommodates a drive 3 in the form of an electric motor. It is understood, however, that any other motor, such as an Otto- or Diesel motor may be used also. The electric motor is fed with energy from an energy store in the form of a re-chargeable battery. Also, exchangeable batteries may be used instead of integrated batteries. If a fuel motor is used, a fuel tank may be used for fuel, such as petrol, diesel petrol, other oils, hydrogen, natural gasoline, ethanol and the like. In the present embodiment, the accumulator is recharged when the brakes are activated or upon downhill driving.

Figure 4:
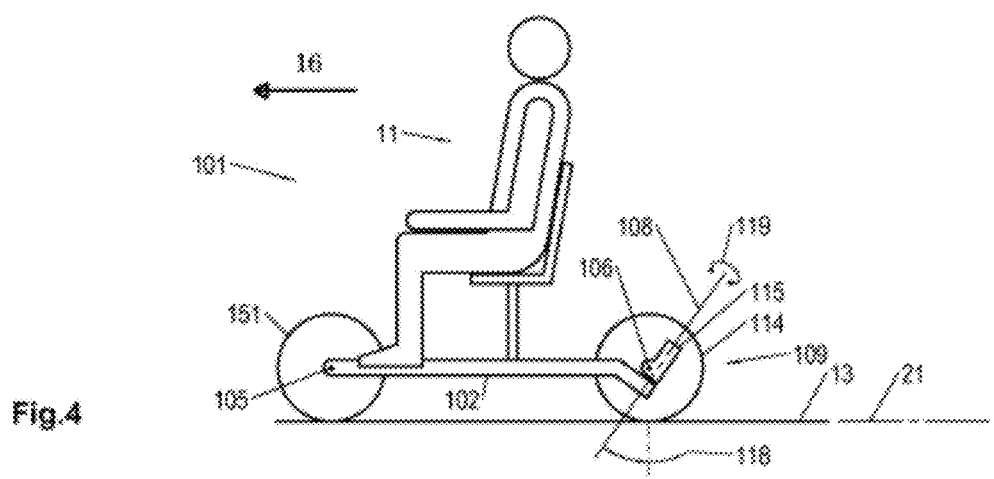
FIG. 4 is a side view of a tricycle with steering rear axle without adjustable pitch angle according to a second embodiment.

The body 2 is provided with a front axle 5 and a rear axle 6. In the present embodiment only one wheel 51 is provided at the rear axle 6 and two wheels 14 are provided at the front axle 5. Different embodiments are provided with two wheels in the front and at the rear each, such as it is, for example, shown in FIGS. 5 to 8. Furthermore, it is possible to provide the rear axle 6 with two wheels and the front axle 5 with only one wheel. Such a second embodiment is shown in FIG. 4.

Figure 9:
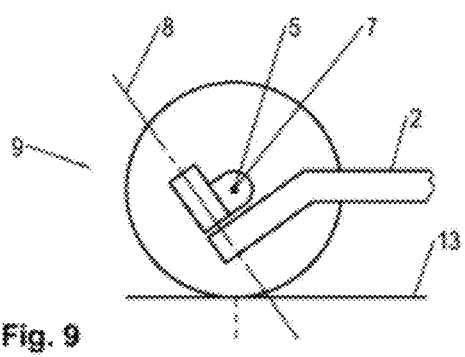
FIG. 9 is a side view of the steering unit without adjustable pitch angle.

The front axle 5 in the present, first embodiment is the steering wheel axle 7 (FIG. 9). It is also possible to use the rear axle as the steering wheel axle. The front axle 5 in the form of a steering wheel axle 7 is tightly connected to a steering unit 9. In the present embodiment the front axle 5 extends through the steering unit 9 and is welded or otherwise connected to it. The steering unit 9 is a piece of material which is sufficiently large to exert the forces described below. The forces can be exerted directly with the feet or hands of the driver, a lever or any other force transmitting means on the steering unit 9. In the present embodiment the steering unit 9 comprises an essentially plane main body 15 which has a longitudinal shape in the direction of the front axle 5, accommodating the feet of the driver on the right and on the left of the steering shaft 8. The front axle 5 extends through side projections at the main body 15 and is tightly connected thereto. The steering unit 9 may also comprise either the steering wheel axle or be connected thereto. Two coaxial wheels 14 are rotatably connected to the front axle 5. This can be recognized in FIG. 2 and FIG. 3. An independent wheel suspension is not necessary here. The steering unit 9 is connected to the body 2 by a bearing 30. The bearing 67 enables the rotation of the steering unit 9 about an axis 8 designated as "steering shaft" perpendicular to the steering front axle. The rotation of the steering unit 9 about such steering shaft 8 effects a stable inclination position of the body 2 relative to the road surface 13.

In FIG. 1 only one of the two wheels 14 is shown. The position of the two front wheels 14 relative to each other can be well recognized in FIGS. 2 and 3. The wheel 51 in this embodiment serves as the driving wheel. The main body 15 is connected to the body 2 by the bearing 30 for the steering shaft 8 in such a way that the steering axis 8 is inclined in the driving direction 16. This can be well recognized in FIG. 1.

The vehicle is essentially symmetrical with a plane of symmetry 17 extending perpendicular to the road surface 13 and the representation plane of FIG. 1. The measure of the inclination of the steering shaft 8 is described by the pitch angle 18. For example, if the steering shaft 8 is perpendicular to the road surface 13 the pitch angle 18 is 0°. For example, if the steering shaft 8 extends parallel to the road surface 13 and forwards the pitch angle 18 is 90°. FIG. 1 shows a pitch angle 18 according to the present invention which is smaller than 90° and larger than 0°.

The steering angle 19 is the rotational angle about the steering shaft 8. The steering angle is defined here as the angle between the plane of symmetry 17 of the vehicle 1 and the front axle 5. In the neutral position which is shown in FIG. 1 all three wheels 14, 51 contact the road surface 13. This can be recognized in FIG. 2. Upon changing the steering angle 19 in a positive or negative direction, i.e., towards the right or the left, the spatial arrangement between the steering unit 9 with the front axle 5 and the body 2 will change. All three wheels 14, 51 remain in contact with the road surface 13. There are also dynamic cases with further forces which causes one or more wheels 14 to loose contact with the road surface 13.

The vehicle has a longitudinal axis 21 of the vehicle in the plane of symmetry 17. It can be defined as the crossing of the plane of symmetry 17 and the plane road surface 13. Due to the inclination of the steering shaft 8 in the driving direction 16 about the pitch angle 18 the sideways inclination of the body 2 is changed when the steering angle 19 is unequal 0°. The plane of symmetry 17 of the vehicle 1 is inclined towards the road surface 13 by an inclination angle 27. The inclination angle 27 is a measure for the sideways inclination. The inclination angle 27 (FIG. 10) is a function of the pitch angle 18 and the steering angle 19.

For illustration and better understanding, two extreme cases are described by way of example: With a pitch angle 18 of 0° the steering shaft 8 extends practically perpendicular to the road surface 13. In this case the steering angle 19 does not have any impact on the sideways inclination of the vehicle 1 in the quasi-static case. If the pitch angle 18 is 90° the steering shaft 8 extends parallel to the driving direction 16. The absolute value of the steering angle 19 is then, idealized, almost the same as the pitch angle 27. If the steering shaft 8 would extend along the road surface 13 both angles would indeed be identical. Such considerations are of a more theoretical kind. The steering radius 26 of the vehicle 1 would be infinite and the vehicle 1 can only drive forwards. The vehicle 1 according to the present invention has a pitch angle 18 in the range between 0° and 90° and may not assume either one or the other boundary value of the range.

During the steering procedure the steering angle 19 is unequal 0°. Due to the inclination of the steering shaft 8 in the driving direction 16 the center of gravity 24 of the vehicle is shifted in the curve 25 during the steering procedure. Thereby, an increased driving stability of the vehicle 1 is achieved in the same way as with common two-wheeled vehicles 1. In the top view in FIG. 3 it can be recognized how the center of gravity 24 of the vehicle is on the inner side of the curve with respect to the longitudinal axis 21 of the vehicle. For better understanding: such an effect would not occur with an inclination of the steering shaft 8 opposite to the driving direction 16. In such a case the center of gravity would be shifted away from the curve 25 and the driving dynamic behavior would be worse.

The described vehicle operates as follows:

If, for example, the driver exerts a pressure with the left foot on the left side of the steering unit, the steering unit will rotate about the steering shaft 8 which is forwardly inclined. The inclination of the steering shaft will cause a steering movement towards the right as it is the case with common vehicles which will cause a change of the driving direction. The rotation of the steering unit relative to the body will also cause an inclination of the vehicle about the longitudinal axis 21 of the vehicle. Such movement counteracts the centrifugal forces during cornering. A high driving stability is achieved. Consequently, the vehicle is inclined during cornering in the curve. Of course, the pressure on the right side of the steering unit will cause a cornering towards the left and a corresponding inclination of the vehicle to the left.

The inclination of the body is not caused by the inclination of the driver, as it is the case with a motor cyclist, but by the rotation of the steering unit. The connection of steering and inclination in a common unit, i.e. the steering unit, will achieve great cost savings.

If the steering shaft is strongly inclined forwards the pressure on one side of the steering unit and the corresponding steering angle will cause a "lesser" cornering with larger curve radius than if the steering shaft is inclined only by a little. On the other hand such strong forward inclination of the steering shaft will cause a larger inclination of the vehicle in such direction. Such an adjustment must be preferred at higher velocities.

If the steering shaft is inclined forwards only very little, i.e. extends rather steeply, the pressure on one side of the steering unit and the corresponding steering angle will cause a strong curvature with small curve radius. The inclination of the body, however, is rather small. This setting is preferred with small velocities, such as for maneuvering.

2. Embodiment: Tricycle with Steering Rear Axle (FIG. 4)

In FIG. 4 an alternative vehicle 101 is shown which is provided with two coaxial wheels 114 on a rear axle 106. Contrary to the first embodiment described above only the rear axle 106 is connected to the steering unit 109 or forms an integral portion thereof, instead of the front axle 105. In the present embodiment no steering unit is provided at the front axle 105. The driving wheel is now the wheel 151 at the front axle 105.

The steering unit 109 is connected to the body 102 rotatably about a steering shaft 108. As in the above embodiment the pitch angle 118 and the steering angle 119 will determine the kind of driving.

Contrary to the embodiment shown in FIG. 1 the steering shaft 108 is inclined against the driving direction 116. This is because the effect according to the present invention is achieved only if the steering shaft is directed upwards in a direction remote from the vehicle. Consequently, if the steering unit is connected to the front axle an inclination upwards towards the front is necessary. If the steering unit is connected to the rear axle 106 an inclination of the steering shaft upwards towards the back is necessary.

In the present embodiment the pitch angle 118 has a value which is larger than 0° and smaller than 90°. The pitch angle is defined in such a way that at 90° the steering shaft 108 is directed parallel to the road surface 113 and against the driving direction 116. The pitch angle 118 can be well recognized in FIG. 4. As with the first embodiment the movement of the steering unit 109 will cause an inclination of the body 102 about the longitudinal axis 21 of the vehicle in the "correct" direction, i.e. in the direction of the cornering movement. With this assembly also the driving stability and the driving dynamic behavior of the vehicle 101 is improved.

In both embodiments the rule applies, that the steeper the pitch angle 18 and 118, respectively, the larger is the inclination of the body for the same curve radius.

The steering wheel axle 5 or 106, respectively, is defined in the neutral, stable and upright state of the vehicle 1, where the plane of symmetry 17 of the vehicle 1 or 101, respectively, extends perpendicular to the road surface 13. The steering wheel axle 5 or 106, respectively, connects the centers of both wheels 14 or 114, respectively, and is fixed with respect to the steering unit.

Figure 10:
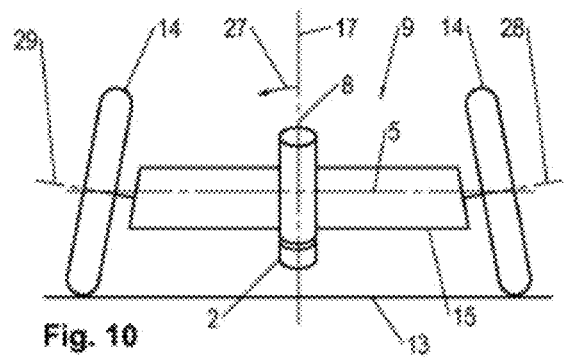
FIG. 10 is a front view of the steering unit with wheels having wheel camber.

The individual rotational axes of the suspended wheels 14 or 114, respectively, may also slightly deviate therefrom depending on the respective driving situation. Such a deviation is possible, for example, at initial springing procedures, side inclinations, wheel track and wheel camber. In the first, as well as in the present second embodiment both wheels 14 and 114, respectively, of the front axle 5 or the rear axle 106, respectively can be accommodated with wheel camber with respect to the steering wheel axle 5 or 106, respectively. This is illustrated in FIG. 10. It can be recognized, that the rotational plane of the wheels 14 is inclined with respect to the plane of symmetry 17 of the vehicle 1 when standing still. The wheels 14 quasi have a larger distance on the road surface than above the road surface. Thereby, the driving stability at cornering is additionally increased. The side forces on the wheels generated during cornering are more advantageously received thereby. Not only an axial but also a radial force component is generated by the outer curve wheel. In order to stabilize the forward driving both wheels 14 belonging to the steering unit 9 can be accommodated with wheel camber relative to the axle 6. It is understood, that also the wheels 114 of the second embodiment and of all further embodiments described here, can be accommodated with wheel camber.

3. Embodiment: Vehicle with Two Steering Axles (FIGS. 5 to 8)

Figure 5:
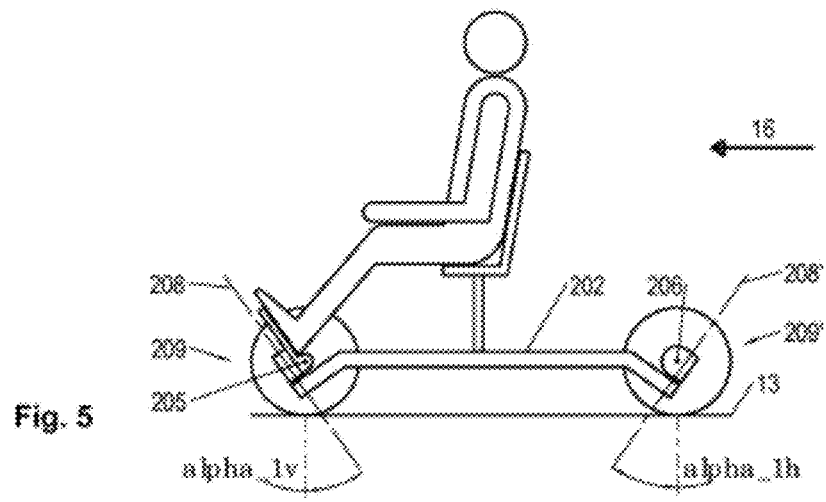
FIG. 5 is a side view of a four-wheel vehicle with steering front and rear axle without adjustable pitch angle according to a third embodiment.
Figure 6:
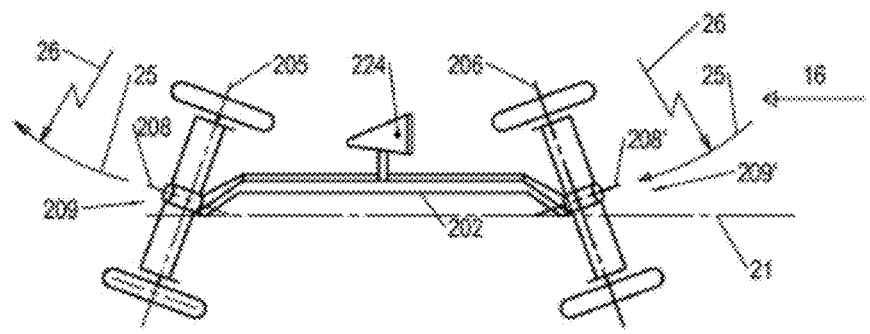
FIG. 6 is a top view of the four wheeled vehicle of FIG. 5 when driving around a corner towards the right.

In FIG. 5 an alternative vehicle 201 is shown which has two coaxial wheels at the front axle 205 and two coaxial wheels at the rear axle 206. Such a vehicle is a combination of the embodiments 1 and 2 and works in the same manner. The steering shafts 208 of the front axle and 208' of the rear axle are each described by the pitch angle alpha_1v and alpha_1h. In order to ensure constant ground contact of all four wheels to the road surface 13 it is necessary that alpha_1v=alpha_1h.

Figure 7:
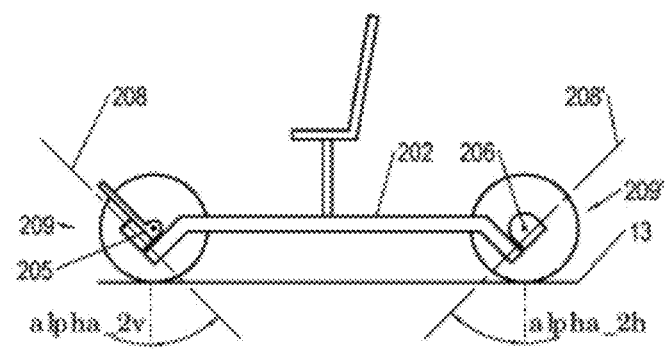
FIG. 7 is a side view of a four-wheel vehicle with steering front and rear axle without adjustable pitch angle according to the third embodiment with smaller pitch angle than in FIG. 5.
Figure 8:
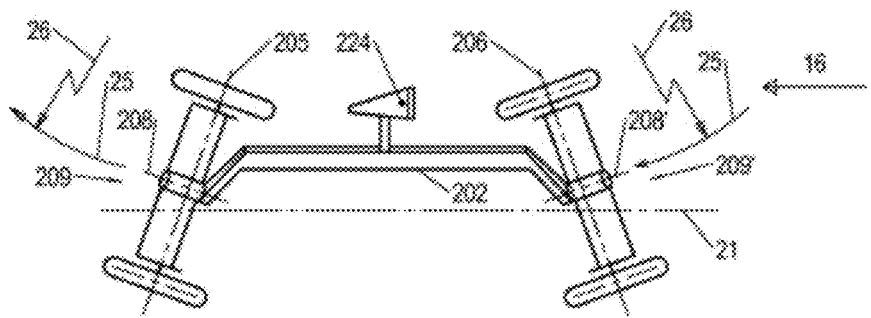
FIG. 8 is a top view of the four-wheel vehicle of FIG. 7 when driving around a corner towards the right.

In FIG. 7 an alternative modification of the embodiment is shown with a flatter pitch angle. The angle of the front steering axle 208 is alpha_2v and the angle of the rear steering axle 208' is alpha_2h. They also must correspond to the ratio alpha_2v=alpha_2h. Furthermore, it is: alpha_1v<alpha_2v. As a consequence, a vehicle according to the alternative modification has a higher degree of inclination with the same curve radius 26 as the vehicle of FIGS. 6 and 7. The center of gravity of the vehicle 224 in the alternative modification is deeper in the inside of the curve. This leads to a better stability at higher velocities.

4. Embodiment: Tilting Joints (FIGS. 11 and 12)

Figure 11:
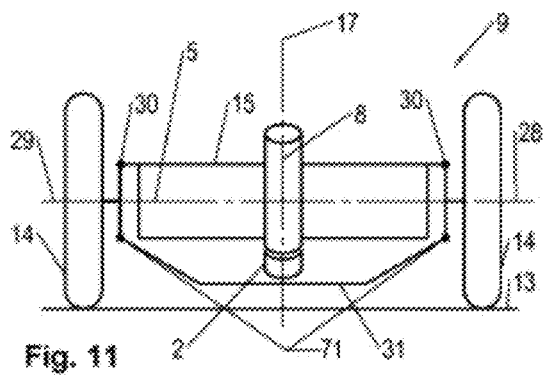
FIG. 11 is a front view of the steering unit with wheels having parallelogram suspension.
Figure 12:
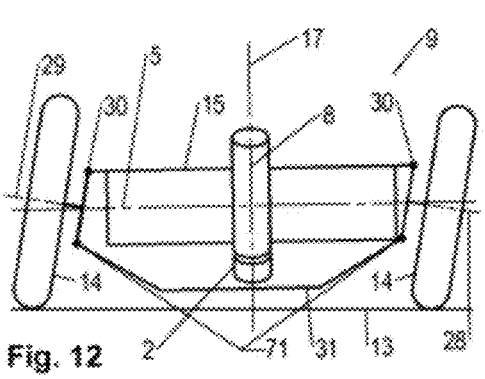
FIG. 12 is a front view of the steering unit with wheels with parallelogram suspension in an inclined position when driving around a corner.

In FIG. 11 shows a possible modification of the steering unit 9 of the first embodiment where the rotational axes 28 and 29 of the corresponding wheels 14 are additionally rotationally suspended by means of tilting joints from the main body 15. The use of tilting joints 30 is advantageous but not necessarily required. Such a suspension is, of course, possible with all embodiments, even if it is described only with reference to this particular embodiment.

The axles of such tilting joints 30 extend parallel to the plane of symmetry 17 of the vehicle 1. However, they do not necessarily extend parallel to the road surface 13. By some kind of parallelogram suspension both wheels 14 are connected to further joints 71 by means of a coupling rod 31. Thereby, they can carry out a sideways tilting movement depending on each other and assume a tilted position relative to the road surface 13. Such a tilted position can be well recognized in FIG. 12. Thereby, the dynamic side position of the vehicle 1 is additionally stabilized, in particular when driving around a corner.

The tilting joints 30 enable the shifting of the center of gravity 24 of the vehicle in the curve. Simultaneously, the side forces at the wheel 14 and at the suspension are received more advantageously. With an ideal parallelogram suspension 31 both wheels 14 remain parallel to each other. By providing wheel track and/or wheel camber, as well as by fitting the geometric parameters of the parallelogram suspension 31 it is possible to relate the spatial relation of the wheels 14 with respect to each other depending on the driving position and to adapt to the desired dynamic features.

Figure 13:
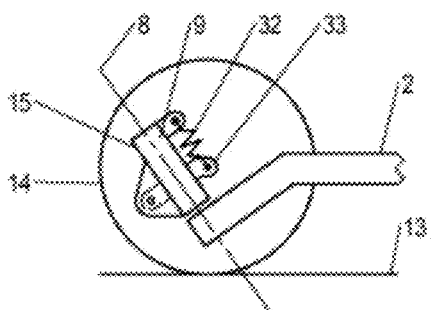
FIG. 13 is a side view of the steering unit with spring borne, beared wheels.

5. Embodiment: Resilient or Dampening Elements (FIG. 13)

In addition to the features of the embodiments described above the wheels 14 are received by resilient and/or dampening elements 32 at the main body 15. This is illustrated in FIG. 13 for the first embodiment. The use of resilient or dampening elements 32 is advantageous, but not necessary. Such a dampening is, of course, possible with all embodiments, even if it is described only for this particular embodiment.

In the present embodiment the wheels 14 are received by further swing arms 33. The swing arms 33 are cushioned and/or dampened with respect to the main body 15 of the steering unit 9. Common springs and/or dampeners 32 may be used for this purpose which are also used for bicycles or motorcycles. Torsion elements are also suitable. The springs, dampeners or torsion elements 32 are fitted in such a way that the rotational axles of both wheels 14 are aligned in the neutral position, i.e. when driving straight forward.

Figure 14:
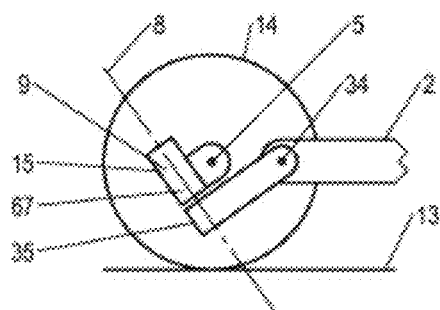
FIG. 14 is a side view of the steering unit with adjustable pitch angle and an exemplary assembly between a cross connector and a pitch axle.

6. Embodiment: Pitch Axle with Cross Connector (Cardan Joint) (FIG. 14)

Figure 15:
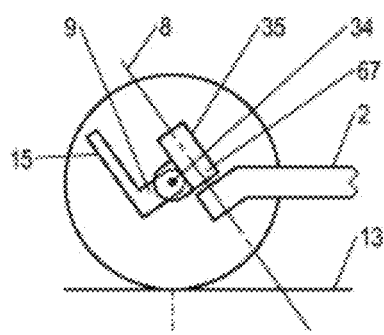
FIG. 15 is a side view of the steering unit with adjustable pitch angle and another exemplary assembly between a cross connector and a pitch axle.

With such modification of the embodiments described above the steering unit 9 is rotatably beared about a further axle 34 with the body 2. FIG. 14 shows a first possibility of the rotatable bearing. FIG. 15 shows a second possibility for rotatable bearing.

The additional axle is called pitch axle 34. The pitch axle 34 extends parallel to the steering wheel axle, i.e. either the front axle 5 in the first embodiment or the rear axle 106 in the second embodiment. For realizing the further bearing a joint element, for example in the form of a cross connector 35, is provided between the main body 15 and the body 2. The cross connector 35 is the bearing for the steering shaft 8 and the pitch axle 34. On one hand the steering shaft 8 is connected to the main body 15 by the cross connector 35 and on the other hand the pitch axle 34 is connected to the body 2. A cardanic connection is achieved thereby between the body 2 and the steering unit 9.

The cross connector 35 is rotatably connected to the body 2 about the pitch axle 34 in the present embodiment. The main body 15 is rotatably connected to the cross connector 35 about the steering shaft 8. The pitch axle can be well recognized in FIG. 14. It extends parallel to the wheel axle 5 through the connection with the body 2.

By the use of one of the assemblies shown in FIG. 14 a rotation of the cross connector 35 by means of the steering unit 9 provided therewith with the main body 15 about the pitch axle 34 causes a variation of the steering shaft 8 with respect to the body 2. In such a way the pitch angle 18 can be adjusted to a desired value.

It is understood, that the described cross connector can be used for various embodiments and is not limited to the modifications in connection with the first embodiment.

7. Embodiment: Pitch Axle with Cross Connector (Cardan Joint) as an Alternative Embodiment (FIG. 15)

An alternative embodiment for the design of the cross connector 35 is shown in FIG. 15. The bearings are quasi exchanged here. The bearing 67 provided between the body 2 and the cross connector 35 enables a rotation about the steering shaft 8. The main body 15 is connected pivotably about the pitch axle 34 to the cross connector 35.

Depending on the position of the pitch axis 34 different features for the vehicle will be obtained. If the pitch axle 34 extends along the front axle 5 a rotation of the main body 15 about the pitch axle 34 will not necessarily cause a change of the remaining vehicle kinematics. Only the main body 15 is moved. The cross connector 35 will not move in space. If the pitch axle extends outside the front axle 5, a rotation of the main body 15 about the pitch axle 34 will cause a variation of the spatial position of the wheels 14 at the steering front axle relative to the cross connector 35 and the body 2. Such a variation will cause a change of the vehicle structure relative to the road surface 13. Thereby, the direction of the steering shaft 8 and the corresponding pitch angle 8 will change. The degree of such a change is, however, much smaller compared to the assembly of FIG. 14. This embodiment is advantageous in cases, where only an adjustment of the main body is desired.

8. Embodiment: Pitch Axle on the Steering Wheel Axle (FIG. 16)

Figure 16:
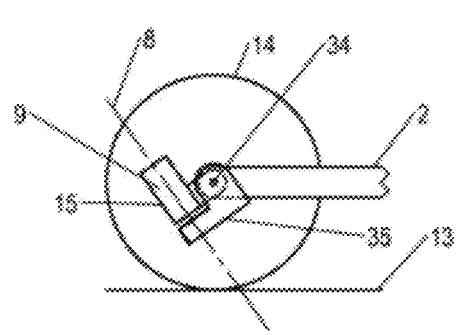
FIG. 16 is a side view of the steering unit with adjustable pitch angle and a third exemplary assembly between a cross connector and a pitch axle.

FIG. 16 shows an embodiment where, apart from resiliencies in the system or the integration of resilient elements, the pitch axle 34 at stillstand extends coaxially to the steering wheel axle 7, the front axle 5. It is understood, that the basic idea can be applied to the rear axle 106 also. This mechanical assembly is similar to the embodiment shown in FIG. 14. The cross connector 35 is connected to the body 2 and rotatable about the pitch axle 34. The main body 15 pivots about the steering shaft 8 and is connected to the cross connector 35.

With such an assembly it is possible to change the pitch angle 18 and to rotate the steering unit 9 with respect to the wheels 14 and with respect to the body 2 at the same time. The advantage of this solution is that the rotation does not generate any resistance and can be carried out with only small forces and torques.

9. Embodiment: Pitch Axis Deeper than the Steering Wheel Axle (FIG. 17)

Figure 17:
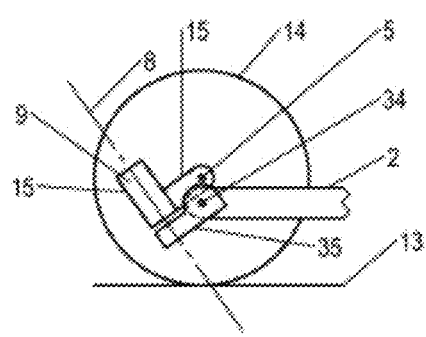
FIG. 17 is a side view of the steering unit with adjustable pitch angle and a fourth exemplary assembly between a cross connector and a pitch axle.

FIG. 17 shows an embodiment where the pitch axis 34 extends closer to the road surface 13 than the steering wheel axle 5. It is understood, that the basic idea can be also applied to the rear axle 106. Thereby, a particularly stable position of the steering unit 9 is achieved. Due to the statics of the vehicle 1 a resulting torque is always generated about the pitch axle 34 outside such a stable position. Such torque forces the steering unit 9 into the stable position and provides an optimum, neutral pitch angle 18 where all forces in the vehicle are balanced.

10. Embodiment: Controlling of the Pitch Angle (FIG. 18)

Figure 18:
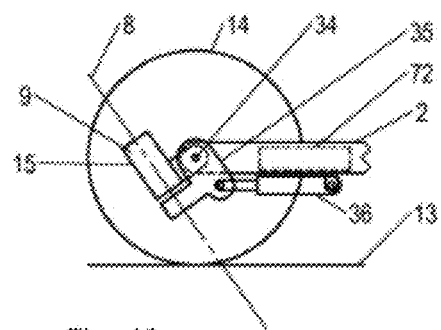
FIG. 18 is a side view of the steering unit with a pitch angle which is adjustable by an actuator.

FIG. 18 shows an advantageous solution for adjusting the pitch angle 18. A signal processing- and control unit 72 receives sensor signals with information about the state of the vehicle, such as the driving velocity, the present pitch angle 18, the present steering angle 19 and/or the inclination 27. The signals of the sensors (not shown) are processed by means of the signal processing unit 72. An optimum ratio between the parameters describing the vehicle state is determined. Databases, curves, equilibria and learning systems may be used for this purpose. The results can be calculated either continuously or in discrete time intervals. Since the steering angle 19 is set by the driver 11 the pitch angle 18, in particular, is fitted to the respective dynamic conditions. Active controllers and actuators 36 are provided for this purpose which are set according to a control signal generated by the control unit.

It is, for example, calculated which pitch angle 18 ensures an optimum and stable position on the road surface 13 depending on the velocity and the steering angle 19. The angle calculated in this way is then set by the actuator 36 provided for this purpose. The controller can monitor the driving process online and re-adjust the pitch angle 18 or set the pitch angle 18 depending on pre-defined fine- or roughly distributed velocity intervals, whereby an optimum basis for eventual steering maneuvers is achieved.

11. Embodiment: Dynamic Adjustment of the Pitch Angle (FIGS. 19 to 22)

Figure 19:
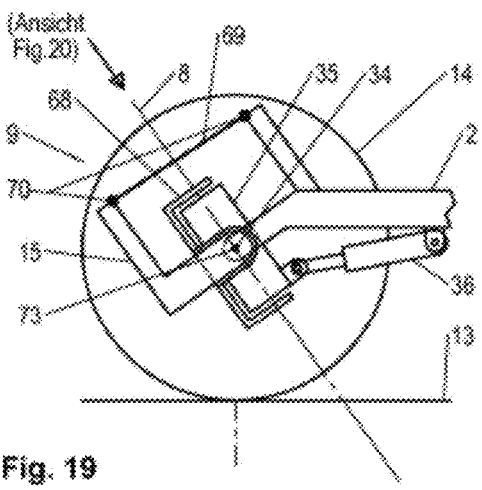
FIG. 19 is a side view of the steering unit with an adjustable pitch angle and two cross connectors in a first position.

FIG. 19 shows an advantageous solution for the dynamic adjustment of the pitch angle 18. It is understood, that the basic idea can also be applied to the rear axle 106. In this embodiment a further cross connector element 68 is provided which is rotatably connected to the first cross connector 35. In this solution the body 2 and the steering unit 9 or its main body 15, respectively, are connected by three independent rotational axles in a series. They are the pitch axle 34, the steering shaft 8 and a further compensating pitch axle 73. The cross connector 35 is rotatable about the pitch axle 34 and connected to the body 2 and the steering shaft 8 is rotatably connected to the second cross connector 68. The second cross connector 68 is rotatably connected to the main body 15.

In the neutral position the pitch axis 34 and the compensating pitch axle 73 are preferably coaxial. Such an assembly enables the independent adjustment of the cross connector 35 and thereby the pitch angle 18 of the steering shaft 8 about the pitch axle 34 without the steering unit 9 undertaking a relative movement relative to the body as it is the case with individual cross connectors. This adjustment can be well recognized in FIGS. 19 and 20 with two exemplary positions.

Figure 20:
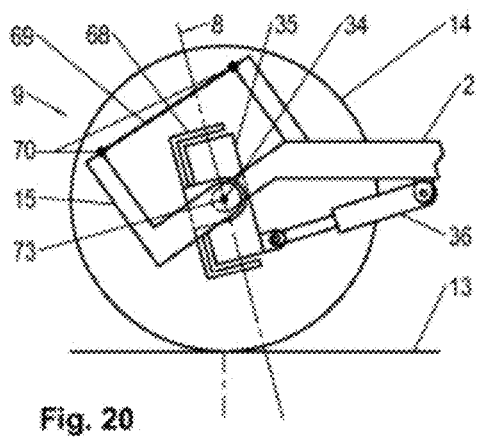
FIG. 20 is a side view of the steering unit with an adjustable pitch angle and two cross connectors in a second position.
Figure 21:
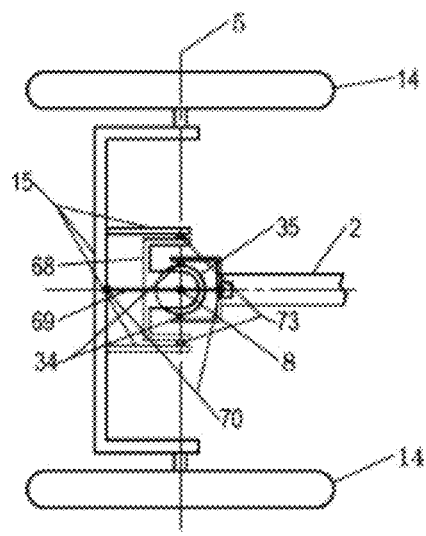
FIG. 21 is a top view on the steering unit perpendicular to the steering shaft with adjustable pitch angle and two cross connectors in a first position.

The movability of the cross connectors 35 and 68 about the two pitch axles 34 and 73 is preferably avoided. This is achieved by an actuator 36 which is shown already in the 10. embodiment. Thereby, a defined position of the cross connectors 35 and 68 and thereby a defined pitch angle 18 is ensured. In FIGS. 19 and 20 it is rotatably connected to the cross connector 35 and is additionally rotatably connected to the body 2. It is understood, that the actuator 36 can achieve the same effect when connecting to a cross connector 68 and the steering unit 9. The presented actuator 36 is shown as a linear drive. It may also be a mechanical, electromechanical, hydraulic or pneumatic kind. It is understood, that any other kind of drive can be used for achieving the same effect, as long as the desired pitch angle is set. For example, a rotation drive may be provided which is integrated directly in one of the pitch axles 34 or 73.

A further, simple possibility is the drive by mechanic forces, for example by cable pull or tie rods, joints, levers or comparable elements. They can be connected to further setting members which are operated by the driver. Thereby, the pitch angle 18 is directly adjusted by the driver 11 by man power.

Figure 22:
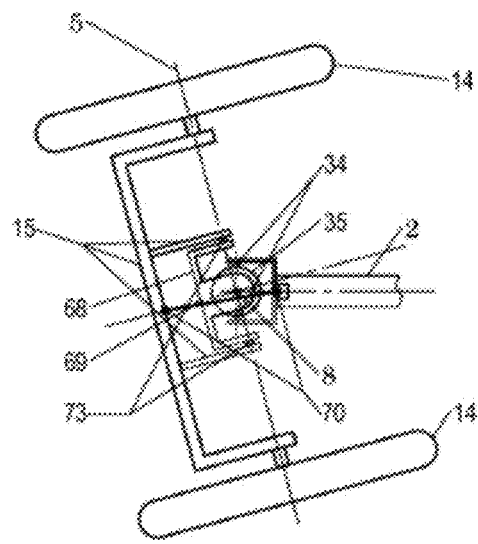
FIG. 22 is a top view on the steering unit perpendicular to the steering shaft with adjustable pitch angle and two cross connectors in a first position when driving around the corner towards the left.

In order to achieve a defined position between the steering unit 9 and the body 2, both are connected by a bar 69 (FIGS. 19 to 22). This bar 69 is connected to the steering unit 9 and the body 2 by respective ball joints 70. It ensures that the otherwise statically under-determined kinematic system, consisting of the body 2 and the steering unit 9, together with the two cross connectors 35 and 68, is statically defined with respect to the pitch axles 34 and 73. In the neutral vehicle position it is then not possible to re-adjust the steering unit 9 with respect to the body 2, even if the cross connectors 35 and 68 were moveable or assumed different positions. At the same time the ball joints 70 at both ends of the bar 69 enable the rotation of the steering unit 9 about the steering shaft 8. In a cornering process, as shown in FIG. 22, the bar 69 provides a defined spatial relation between the steering unit 9 and the body 2. Due to the kinematics in the system, however, the inclination of the steering unit 9 will slightly change with respect to the road surface 13.

Figure 25:
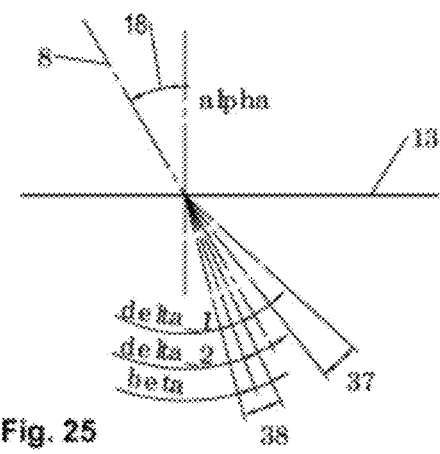
FIG. 25 is a schematic view of possible positions of the pitch angle.

12. Embodiment: Coupling of the Pitch Angle to the Driving or Braking Power (FIG. 25)

The change of the pitch angle 18 can alternatively or additionally be coupled to changes of the driving power of the vehicle 1 and/or the effected breaking power either directly by the driver 11 or by an actuator 36. The pitch angle 18 forms the basis as the influencing measure for the effective forces at the vehicle instead of adjusting the pitch angle depending on processed parameters, as shown in embodiment 10.

A first adjustment range 37 of the pitch angle 18 can be correlated to the driving power and another adjustment range 38 of the pitch angle 18 can be correlated to the breaking power. The adjustment ranges are illustrated in FIG. 25. With a pitch angle 18 being alpha which defines the neutral state, a pitch angle 18 which is larger than alpha+delta_1, wherein delta_1 is a threshold and ≥0 will correlate to an increase of the driving power. Such correlation may be linear, continuous, discrete or any other kind and depends on factors, such as the desired dynamic features, the use concept, etc. In an analogue way a pitch angle 18 which is smaller than alpha-delta_2, wherein delta_2 is a threshold and is ≥0, correlates to the braking effects on the vehicle 1. The pitch angle range between alpha-delta_2 and alpha+delta_1 will not cause any desired changes of the longitudinal kinematics and is understood to be a tolerance range in order to compensate, for example, tolerances during the driving operation.

It is also possible, to define a pitch angle range beta within the braking range 38 which is below alpha-delta_2 and is related to an energy recuperation which has a braking effect as an after-consequence. This also can be recognized in FIG. 25. In the ranges below or overlapping with such mentioned pitch angle range beta a normal braking effect can be achieved.

Alternatively, it is provided to exchange both ranges, whereby a pitch angle 18 which is larger than alpha+delta_1 is correlated to a breaking effect and a pitch angle 18 which is smaller than alpha-delta_2 is correlated to the driving effect.

As described already with FIG. 15 only a small change of the pitch angle 18 would be achieved compared to the embodiment of FIG. 14 with a second alternative embodiment of the cross connector between the main body 15 and the body 2. The pitch angle may be considered here as being almost constant. Since the main body 15 may nevertheless be rotated about the pitch axle 34 the position of the main body 15 with respect to the body 2 may also be coupled to the forces effective on the vehicle 1. The position can be described similar to the pitch angle 18 as the angle with angular ranges 38 and 38. Such angular ranges are related to the driving- or with the braking power at the vehicle 1. Such effect can also be realized with the solution of FIG. 16.

Figure 23:
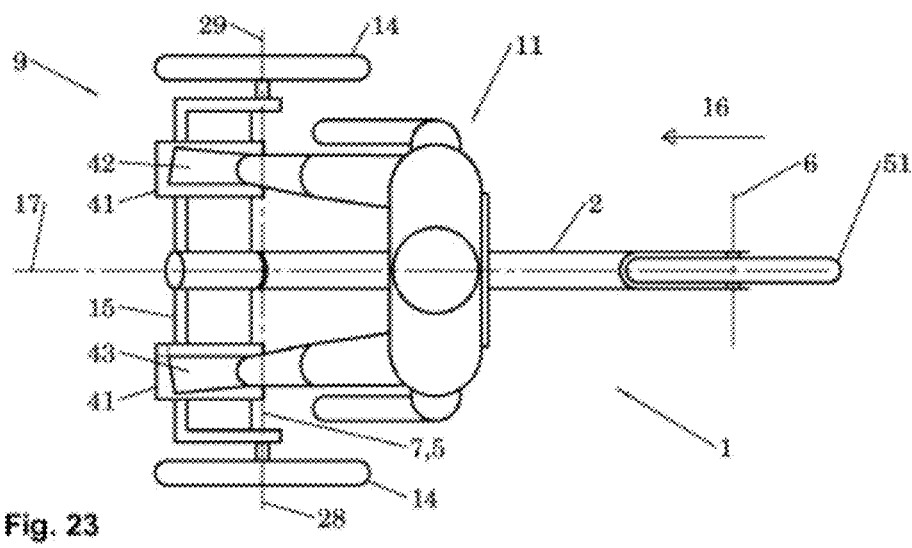
FIG. 23 is a top view of a tricycle with a driver having his feet supported on the steering unit.

13. Embodiment: Modification of the Steering Unit (FIG. 23)

The position of the driver 11 within the vehicle 1 is mostly upright. This enables a good overview of the driving situation for the driver 11. This is well shown in FIG. 1 from the side. In FIG. 23 a top view is shown of this solution. The feet 42 and 43 of the driver 11 are provided on feet resting elements 41. The feet resting elements 41 receive the occurring leg-/feet-/weight forces.

Figure 24:
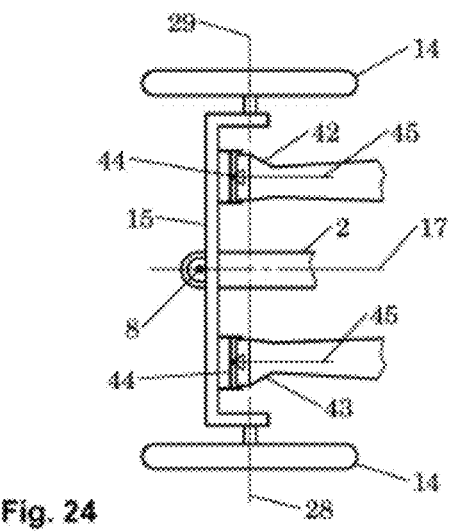
FIG. 24 is a top view of the steering unit, the view being perpendicular to the steering shaft, with feet supported on the steering unit.

The steering unit 9 comprises force receiving elements 44 which are specially designed for receiving forces. They can be recognized in FIGS. 23 and 24. Such force receiving elements 44 in the present embodiment are designed as plane surfaces or projecting ranges receiving the feet 42 and 43 of the driver 11. The force receiving elements 44 transmit forces of the driver 11 to the steering unit 9. Thereby, the driver exerts a torque on the steering unit 9 about the steering shaft 8. The torque causes a rotation of the steering unit 9 relative to the body 2 corresponding to the desired steering maneuver.

The force receiving elements 44 in the present embodiments are an integral part of the main body 15. Furthermore, slip-proof contact elements and limiting frame walls are provided. Alternatively, only local contact ranges may also be provided which do not cover the entire sole.

Figure 27:
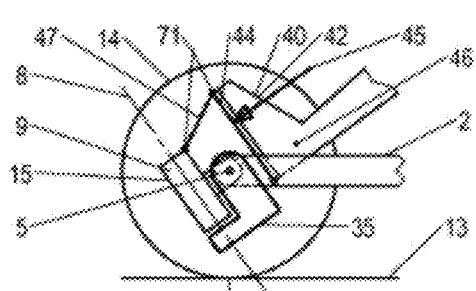
FIG. 27 is a side view of the steering unit with indirect foot power impact through intermediate elements.

14. Embodiment: Indirect Controlling of the Steering Unit by Means of the Foot (FIG. 27)

An alternative assembly provides that the force receiving elements 44 are separate bodies which are accommodated at the body 2. The foot forces 45 are transmitted to the steering unit 9 by downstream transmission members 47. The transmission members 47 may be operated mechanically, hydraulically or electromechanically. The foot forces 45 generate and maintain a torque about the steering shaft 8. This is solved as a mechanical transmission in FIG. 27 by way of example.

Figure 26:
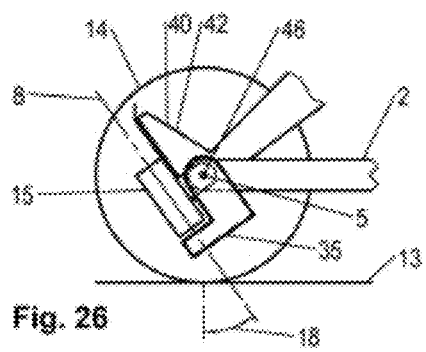
FIG. 26 is a side view of the steering unit with direct impact of the feet power.

15. Embodiment: Adjustment of the Pitch Angle by Foot (FIG. 26)

In the embodiments with an adjustable pitch axle 34 the exertion of a torque by foot about the respective ankle joint, a torque can be generated about the pitch axle 34. The pitch angle 18 is set directly by the impact of the manpower of the driver 11. This is illustrated in FIG. 26. The feet 40, 42 and 43 of the driver 11 rest on the main body 15. The rotational axis of the ankle joint corresponds about to the pitch axle 34. Straightening and flexing the foot 40, 42 and 43 about such axis 46 will then generate a torque at the main body 15 and cause a rotation about the pitch axle 34. No force and no torque is exerted on the steering wheels. The position of the body 2 is not influenced.

By changing the pitch angle 18 in stand still position or during driving it is possible to adjust the steering shaft 8 with respect to the body 2 and with respect to the steering wheels 14. By an additional dependency of the steering angle 19 an impact can be made on the inclination of the body 2. With higher velocities the driver 11 can set the pitch angle to a larger value and provide a direct dependency between the steering angle 19 and the inclination of the body 2.

With a curve radius 26 being R and with a higher velocity with corresponding higher centrifugal forces it is possible to set a higher inclination angle 27 with respect to the road surface 13 and a better dynamic position. A lower velocity with the same curve radius 26 being R would require a smaller inclination whereby the pitch angle 18 can be adjusted to a smaller value.

16. Embodiment: Wheels with Wheel Camber and/or Wheel Track (FIG. 10)

With a steering unit embodiment, where the wheels 14 are received with wheel camber and/or wheel track and where the pitch angle can also be adjusted such camber/track adjustments are carried out in the vehicle neutral position 20 whereby they will result in a more stable position of the steering wheel axle 7 at pitch angle positions at higher velocities.

Figure 28:
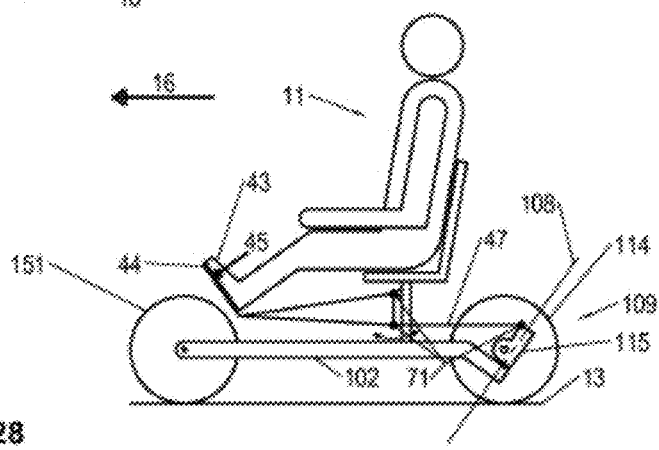
FIG. 28 is a side view of the tricycle with steering rear axle and mechanical transmission members.

17. Embodiment: Steering of the Steering Rear Axle with the Feet (FIG. 28)

Figure 29:
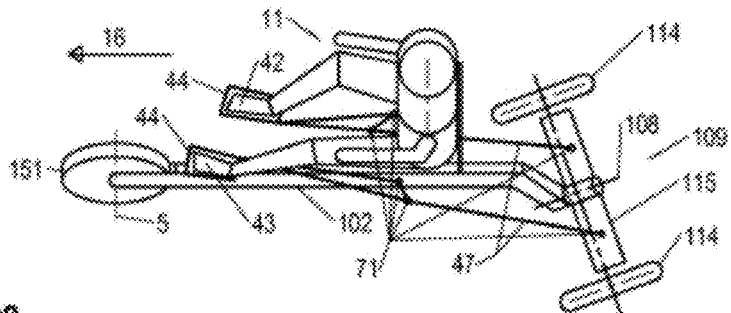
FIG. 29 is a top view of the steering rear axle and mechanical transmission members when driving around a corner towards the right.

The connection between the force receiving elements 44 by further transmission members 47 to the steering unit is advantageous in particular with the steering rear axle 106 according to the second embodiment. The control range of the feet 42 and 43 is connected to the steering unit 109 positioned in the rear. A possible solution is shown in FIG. 28. The force receiving elements 44 are mechanically connected to the steering unit 109 by further transmission members 47. They cause an adjustment of the steering unit 109 with respect to the body 102. In this embodiment a force from the left foot 43 by straightening the left leg will cause a rotation of the steering unit 109 about the steering shaft 108. Then the vehicle 1 will drive around the corner towards the right. This is shown in FIG. 29. In order to improve the ergonomics at this process the position of the force receiving elements 44 is also influenced by the right foot 42. This will cause a pulling back of the right leg. A feeling of cooperation of both legs is generated.

Controlling the pitch angle 18 of a steering rear axle 106 is also possible by additionally rotatably bearing the force receiving elements 44. A torque about the respective ankle joints of the driver 11 is also received and transmitted to the steering unit 109 by further transmission members (not shown). Thereby, a torque about the pitch axle 34 is generated. Also, force measuring sensors (not shown) can be integrated in the force receiving elements 44, which will cause a change of the pitch angle 18 of the rear steering unit 109 by further processing systems and actuators 36.

18. Embodiment: Presence of Handles (FIG. 30)

Figure 30:
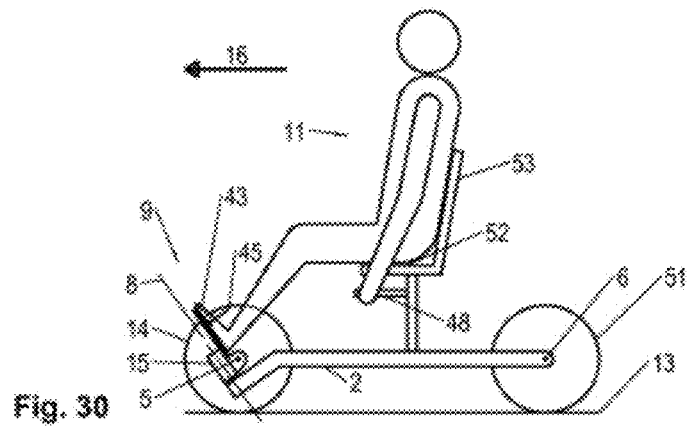
FIG. 30 is a side view of the tricycle with provided handles.

In a further solution additional handles 48 are provided (FIG. 30). They are fixed to the handle bar 49 which is accommodated at the body 2. Thereby, a better support effect is provided for the driver 11. He can transmit the reaction forces more easily on the body 2 when exerting the leg forces or foot forces 45, respectively, or develop higher leg- or foot forces 45.

Furthermore, further elements can be provided at the handles 48, which will influence the driving- or braking power at the vehicle 1. For example, this is the rotary handle for the drive or braking lever for the brakes.

Figure 31:
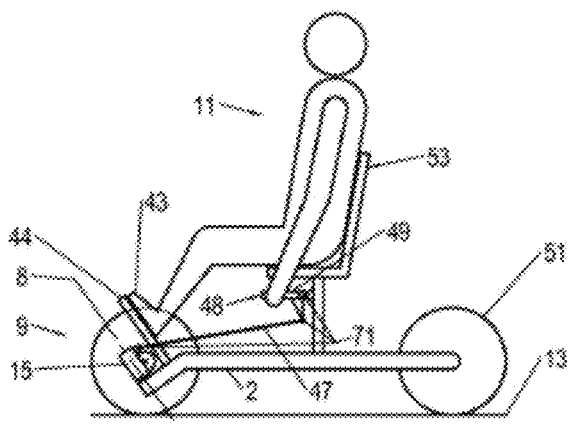
FIG. 31 is a side view of the tricycle with steering front axle and mechanical transmission members which are operated by handles.

Alternatively, it is possible to individually accommodate the handles 48 or together through the handle bar 49 moveably at the body 2, whereby a transmission of the forces to the handles 48 by the driver will cause a relative movement of the body 2. Furthermore, the forces exerted to the handles 48 are transmitted by subsequent transmission members 47 (of the mechanical, hydraulical 5 or electromechanical kind) to the steering unit 9 and generate or maintain a torque about the steering shaft 8. Alternatively, a torque about the pitch axle 34 can be generated or maintained. An exemplary mechanical solution is shown in FIG. 31. A closed power flow between feet 40, 42, 43, legs, body/buttocks, arms/hands, handles 48, body 2/seat 52/back rest 53 and steering unit 9 which will cause a change of the steering angle 19 or the pitch angle 18.

Figure 32:
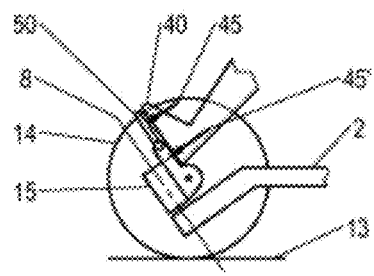
FIG. 32 is a side view of a steering unit with integrated pedals.
Figure 33:
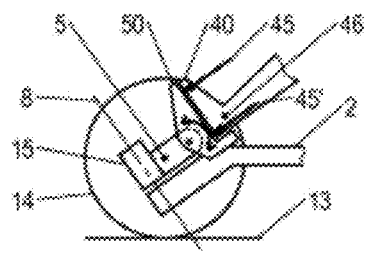
FIG. 33 is a side view of the steering unit with further operating elements.

19. Embodiment: Presence of Pedals (FIGS. 32 and 33)

In order to accelerate or decelerate/brake the vehicle 1 it is, furthermore, possible to provide separate operating elements 50 at the steering unit 9 (with steering front axle 5) or at the body 2 (with steering rear axle 106), which receive a force from the feet 40, 42, 43 of the driver. Such operating elements 50 can coincide with the force receiving elements 44 or be positioned in the power flow between the foot 40, 42, 43 and the force receiving elements 44. Such separate operating elements 50 generate a drive- or brake force at the vehicle 1 by further transmission elements (for example cable pull, gear, electromechanic actuators, etc.). It is possible that one of the operating elements 50 is provided for the purpose of controlling the driving force while another operating element 50 is provided for the purpose of the braking force.

For example, two pedals are fixed to the main body 15 (FIG. 32) if there is a steering front axle 5. The left one is provided for the purpose of braking and the right is provided for the purpose of driving. In this case, the steering unit 9 preferably does not have an additional pitch axle 34 or is designed as in the 11th embodiment according to FIGS. 19 to 22. Thereby, it is possible to rotate the steering unit 9 about the steering shaft 8 by the cooperation of the feet 40, 42, 43 and at the same time to control the driving—and braking force, respectively, by a further controlled exertion of force of the respective feet 40, 42, 43.

Alternatively, the same operating element 50 can be used as the basis for the control of both forces. For example, a certain movement controls the driving force while another movement controls the braking force. A possible solution is shown in FIG. 33. The operating element 50 is accommodated rotatably about an axis at the main body 15. The rotation is effective in two directions. Their respective purpose is the control of the driving force and the braking force. The rotational axis of the operating elements 50 extends parallel to the front axle 5 and the operating element 50 can be controlled by a rotational movement of the feet 40, 42, 43 about the rotational axis 46 between the shank and the foot 40, 42, 43. A rotation of the operating element 50 about the mentioned axis in the driving direction 16 would have an impact on the braking force and a rotation in the opposite direction would have an impact on the driving force. The attribution of the forces can also be in the opposite direction. Such a solution is also possible, in that, as described above already, the main body 15 is connected to the pitch axle 34 by a cross connector 35 and the cross connector 35 is connected by the steering shaft 8 to the body 2. A rotation of the main body 15 about the pitch axle 34 has an impact on the braking- or the driving force of the vehicle 1, without necessarily causing an adjustment of the steering shaft 8.

20. Embodiment: Drive of the Vehicle

The drive 3 of the vehicle 1 according to the present invention can be present coaxially to the driving wheel axle, for example in the form of a wheel hub motor. In such a case the drive 3 is preferably provided in the form of an electric motor. In such a case it is still possible that it is integrated in the steering unit wheels 14, also. It is even possible that the change of the steering angle 19 by an intermediate control electronics will cause a separate control of the driving torques of both wheels in order to support the steering procedure.

It is also possible to place the drive 3 outside of the driving axle and to transmit the driving torque by means of an intermediate gear to the driving wheel 51.

With the latter possibility it is possible to use a combustion engine instead of an electric motor and to connect it by means of a gearing to the driving wheel.

21. Embodiment: Presence of an Energy Storage

The vehicle 1 according to the present invention additionally comprises an energy storage 4 in the form of a battery 65 or a fuel tank.

With an electric battery 65 it is very advantageous if it is designed as a separate module. This can be removed from the vehicle 1. The battery 65 can be removed and be recharged outside the vehicle 1, for example at home or in the office. Furthermore, it is possible to simply exchange such a battery 65 by an already charged one whereby the charging times are considerably reduced.

Figure 34:
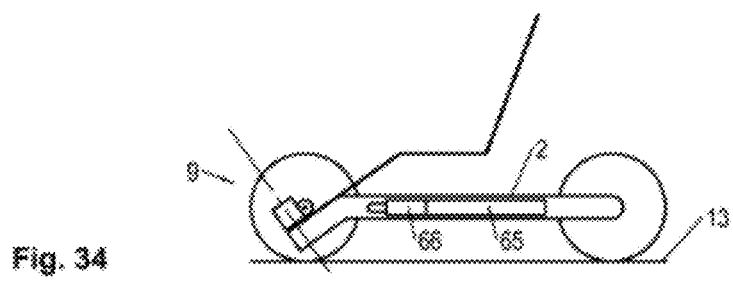
FIG. 34 is a side view of the tricycle with integrated battery and recharging electronics.

Furthermore, it is possible to design the charging electronics 66 of the battery 65 also as a module and to make it connectable to the battery 65 (FIG. 34). The vehicle driver 11 may then remove the battery 65 from the vehicle 1 and charge it at another charging station. He can exchange it then directly with another battery 65. He may then re-charge the battery directly at the vehicle 1 or remove the battery 65 together with the charging electronics 66 and charge it at another location where no battery charging station is available. In the latter case it is very advantageous if the charging electronics 66 is provided with a common inlet connector for non-heating apparatus. Thereby it can be connected to the non-heating apparatus cables which are common and available almost everywhere (such as, for example, for a home personal computer).

Also, it is possible to integrate an energy recuperation system in the vehicle 1 in order to develop a braking force by the drive 3 and to store the generated energy in the battery 65.

22. Embodiment: Presence of a Seat and a Back Rest (FIGS. 35 to 38)

There is the possibility to provide a seat 52 and/or back rest 53 for the driver 11 in order to accommodate a part of the weight force directly in the body 2.

Figure 35:
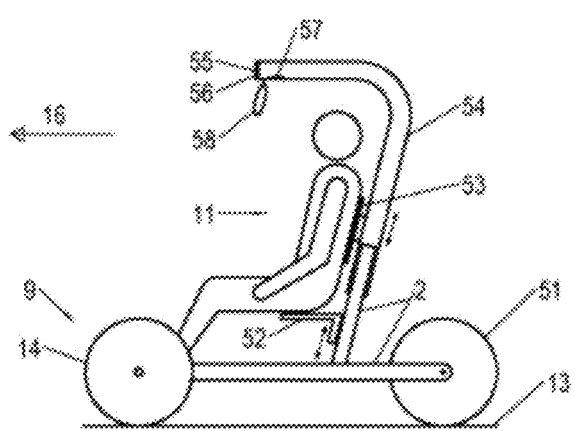
FIG. 35 is a side view of the tricycle with fixed peripheral components.

They are designed in such a way that side forces can be transmitted between the driver 11 and the body 2. In such a way the steering of the vehicle 1 is facilitated. The driver 11 has better possibilities to support the counteracting force resulting from the developed leg-/foot force 45 against the body 2. By the use of only one seat 52 the driver 11 has the possibility to transmit the lateral components of the leg-/foot force 45 sideways into the seat 52 and to effect an adjustment of the steering angle 19. When using additional handles 48 as mentioned above such possibility is even improved. The driver 11 can transfer the forces better to the body 2. With the use of a further back rest 53 the power development is considerably improved. Thereby, the leg-/foot force 45 is supported to a higher degree. In such a case even the removal of the handles 48 is possible. The driver 11 assumes a stable position within the vehicle 1 and can easily develop control forces. As far as the body 2 extends over or beside the driver 11 it makes sense to design such body section 54 adjustable in height whereby optimum spatial conditions for different driver sizes are provided (FIG. 35). This also applies to the seat 52 and the back rest 53, respectively, which can be separately adjustable relative to the body section 54.

Figure 36:
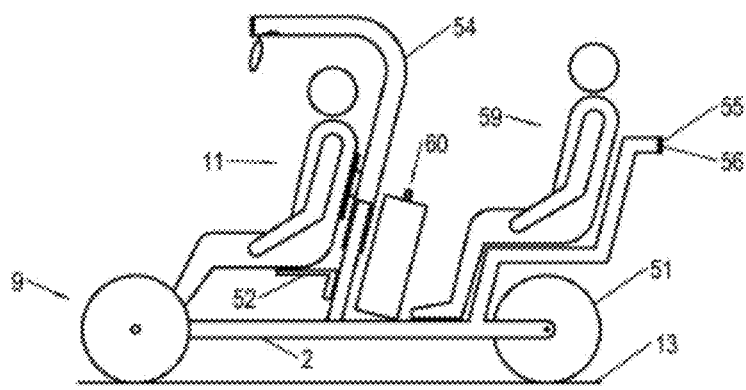
FIG. 36 is a side view of the tricycle with driver and co-driver.

Furthermore, it is very advantageous to provide another seat for further vehicle passengers 59 (FIG. 36). Such passenger 59 is preferably behind the driver 11 and assumes a position which is as low as possible, however comfortable, in order to minimize the torques of inertia. A further seat 52 and a separate back rest 53 is provided for his comfort.

23. Embodiment: Presence of Additional Peripheral Components (FIG. 35)

Furthermore, it is possible to integrate important basic functionalities of the vehicle 1, such as lighting 55, turn signals 56, indicating instruments 57 or rear mirror 58 in the adjustable body section 54. In such a way the optimum assembly for different driver sizes are ensured. For example, such functions can be integrated in a body section 54 which extends above the head of the driver 11. Thereby, they are present in the immediate field of view of the driver 11 (FIG. 35).

Additionally, it is advantageous to provide a baggage rack for baggage 60 (FIG. 36). It can be provided spatially between the driver 11 and the further passenger 59 and is also as low as possible inside the body 2.

It is particularly advantageous to provide only basic functionalities for the successful urban transport in the vehicle 1. These are, for example, only functions which are necessary for the vehicle registration, such as lighting 55, indicators 56, brakes and various necessary indicators 57. The vehicle 1 and its body 2, respectively, are designed as the basis for enhancements, which will enhance the degree of the functionalities. The peripheral enhancements are bought by the driver 11 if required. They can be added to the vehicle in a simple way and without special knowledge.

Figure 37:
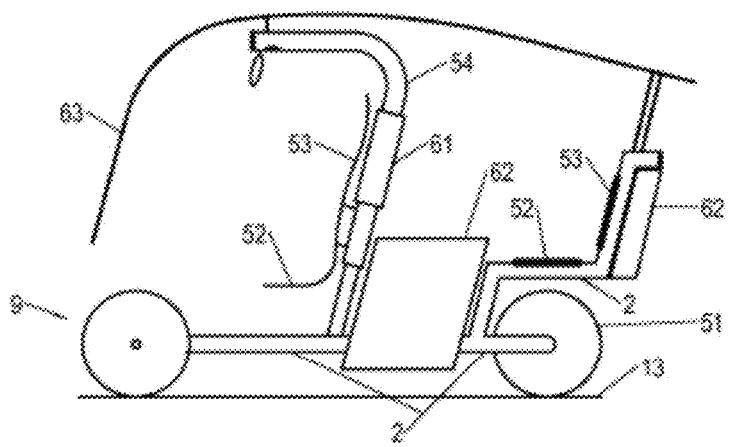
FIG. 37 is a side view of the tricycle with further fixed peripheral components.
Figure 38:
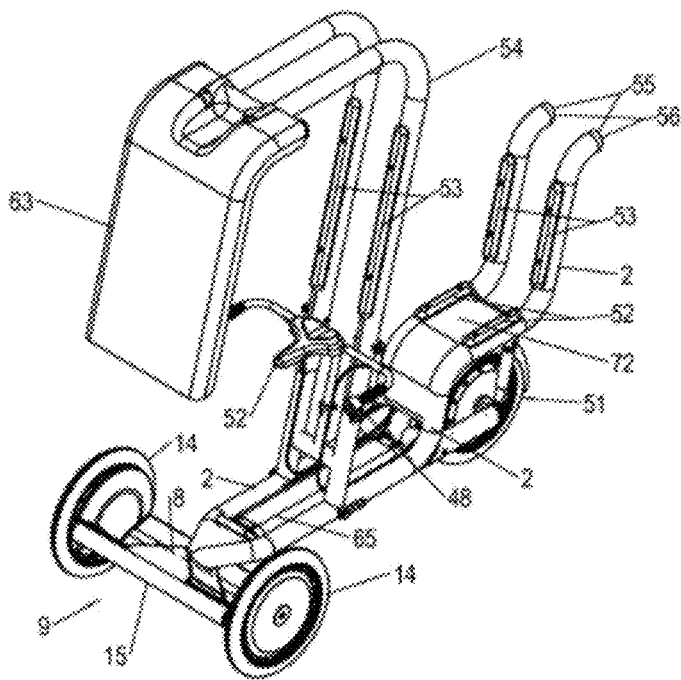
FIG. 38 is a perspective view of the tricycle with steering front axle and possible standard equipment.

Examples for such which do not exploit the entire extent are different seats 52 or back rests 53, cover parts, heating elements 61, baggage compartment modules 62 or transport boxes/—bags 62, environmental impact protection components 63, interfaces for mobile devices 64 and many more (FIGS. 37 and 38).

24. Embodiment: Frame Construction of the Vehicle (FIG. 38)

The body 2 of the vehicle 1 is preferably designed by frame construction (FIG. 38). It is also possible to carry out the body 2 as a plate body or as an extensive plastic body. It is important that the body 2 is the carrying structure at the same time and the design feature of the vehicle 1. Thereby, the use of further covering components can be avoided. As many functionalities as possible are realized with as few components as possible and the costs of the vehicle 1 remain a minimum.

The embodiments described above serve to illustrate the invention claimed in the claims. Features which are disclosed in combination, generally can be used alone also or in combination with other features, which are disclosed in the text or in the drawings either explicitly or implicitly in the embodiments. Measures and sizes are disclosed only by way of example. The person skilled in the art will derive suitable ranges from his knowledge and must not described here in greater detail. The disclosure of a precise embodiment of a feature does not mean that the invention is limited to this precise embodiment. Such a feature can be replaced by many other embodiments which are known to the person skilled in the art. Therefore, the invention cannot only be embodied in the form of the described embodiments, but by all modifications which are covered by the scope of the enclosed claims.

Examples bla

Patent Documents patcit1:

Non Patent Literature nplcit1

The invention claimed is:

1. A vehicle adapted to drive in a driving direction and having a longitudinal vehicle axis extending in said driving direction, comprising
   a self-supporting body carrying a frame or another support structure;
   a first and a second wheel axle, wherein said first wheel axle forms a front vehicle axle and has two wheels and said first wheel axle defines a plane extending perpendicular to said first wheel axle;
   a steering unit connected to said first wheel axle;
   a steering shaft rotatably mounting said steering unit for steering said vehicle, wherein said steering shaft is inclined in said plane perpendicular to said first wheel axle by a pitch angle against a vertical axis, said pitch angle being unequal to zero and smaller than 90°;
   and wherein
   above said wheel axle said steering shaft is directed in a direction remote from said vehicle in said plane perpendicular to said first wheel axle;
   said steering unit is rotatably connected to said support structure, rotatable about said steering shaft, and
   said support structure and said steering unit are adapted to have a torque exerted thereon by a driver supported by said support structure;
   wherein the vehicle further comprises a bearing provided for rotatably bearing said steering unit with a pitch axis extending parallel to the first wheel axle, whereby the steering shaft forms a dynamically adjustable pitch angle in the plane perpendicular to the first wheel axle.

2. The vehicle of claim 1, and wherein said steering unit is rigidly connected to said first wheel axle.

3. The vehicle of claim 1, and wherein said two wheels of said first vehicle wheel axle are adapted to be steered in the same way by said steering unit.

4. The vehicle of claim 1, and wherein said vehicle further comprises electronic and/or mechanic and/or electro-mechanic and/or hydraulic means for adjusting said pitch angle.

5. The vehicle of claim 1, and wherein said bearing for rotatably bearing said steering unit is formed by a cross connector, which enables a rotation of said steering unit about said pitch angle and a rotation of said steering unit about said steering shaft.

6. The vehicle of claim 1, and wherein said bearing for rotatably bearing said steering unit is formed by two pivotable cross connectors which enable a rotation of said steering unit about said steering shaft.

7. The vehicle of claim 1, and wherein said vehicle includes electronic means for adjusting said pitch angle, such electronic means comprising sensors for detecting said vehicle state and signal processing means for generating a control signal for controlling said pitch angle of said steering shaft depending on said detected vehicle state.

8. The vehicle of claim 1, and wherein said vehicle includes mechanical means for adjusting said pitch angle which comprise at least a pedal, a handle or another mechanical hand- or foot-operated actuator, said change of position thereof causing a change of said pitch angle of said steering shaft.

9. The vehicle of claim 1, and further comprising means for fixing said adjusted pitch angle.

10. The vehicle of claim 1, and further comprising a drive and an energy store for supplying said drive with energy.

11. The vehicle of claim 1, and wherein said support structure is formed by pipes.

12. The vehicle of claim 1, and further comprising seats, back rests, handles, baggage racks, cover portions and/or other components which are provided at said support structure.

13. The vehicle of claim 1, and wherein said steering unit is adapted to be actuated by at least a foot of said driver.

14. The vehicle of claim 1, and further comprising a further steering unit for steering said second wheel axle.

15. A vehicle adapted to drive in a driving direction and having a longitudinal vehicle axis extending in said driving direction, comprising
   a self-supporting body carrying a frame or another support structure;
   a first and a second wheel axle, wherein said second wheel has two wheels and said second wheel axle defines a plane extending perpendicular to said second wheel axle;
   a steering unit connected to said second wheel axle;
   a steering shaft rotatably mounting said steering unit for steering said vehicle, wherein said steering shaft is inclined in said plane perpendicular to said second wheel axle by a pitch angle against a vertical axis, said pitch angle being unequal to zero and smaller than 90°; and wherein above said wheel axle said steering shaft is directed in a direction remote from said vehicle in said plane perpendicular to said first wheel axle;

said steering unit is rotatably connected to said support structure, rotatable about said steering shaft, and said support structure and said steering unit are adapted to have a torque exerted thereon by a driver supported by said support structure;

wherein the vehicle further comprises a bearing provided for rotatably bearing said steering unit with a pitch axis extending parallel to the first wheel axle, whereby the steering shaft forms a dynamically adjustable pitch angle in the plane perpendicular to the second wheel axle; and wherein there is a control range for the driver's feet, which is connected via force receiving elements and further transmission members to the rear steering unit, so that the rear steering unit can be adjusted in relation to the support structure.

\* \* \* \* \*